United States Patent [19]
Martin

[11] Patent Number: 4,685,001
[45] Date of Patent: Aug. 4, 1987

[54] METHOD FOR RETRIEVING UNEDITED VIDEO STILL PICTURES

[75] Inventor: William A. Martin, Fairport, N.Y.

[73] Assignee: Eastman Kodak Company, Rochester, N.Y.

[21] Appl. No.: 644,099

[22] Filed: Aug. 24, 1984

[51] Int. Cl.$^4$ ................................................ G11B 7/00
[52] U.S. Cl. ................................ 358/342; 360/14.1; 369/30; 369/34; 369/83
[58] Field of Search ............ 358/342, 102, 93; 369/83, 30, 34; 360/13, 14.1, 14.2, 14.3, 71, 72.1, 137, 35.1

[56] References Cited

U.S. PATENT DOCUMENTS

| | | | |
|---|---|---|---|
| 3,724,935 | 4/1973 | Batter | 352/38 |
| 3,748,381 | 7/1973 | Strobele et al. | 178/6.6 A |
| 4,000,510 | 12/1976 | Cheney | 360/33 |
| 4,210,785 | 7/1980 | Huber et al. | 360/12 |
| 4,210,940 | 7/1980 | Prysby et al. | 360/33 |
| 4,224,644 | 9/1980 | Lewis | 360/72.2 |
| 4,271,489 | 6/1971 | Siryj et al. | 369/38 |
| 4,567,515 | 1/1986 | Schumacher | 358/93 X |

FOREIGN PATENT DOCUMENTS

2337377 7/1977 France .

OTHER PUBLICATIONS

Journal of the SMPTE, vol. 10, #8, Aug. 1971, pp. 605–613.
Siemens Forschungs-Und Entwick Lungs Berichte, vol. 10, #3, 1981, pp. 179–187.
"Electronic Still Camera" Kihara, N. et al Journal of Applied Photographic Engineering, vol. 9, No. 5, Oct. 1983 159–163.
"The Electronic Still Camera a New Concept in Photography" by Kihara, N. et al, IEEE Trans on Consumer Electronics, vol. CE-28, No. 3, Aug. 1982, 325–330.

Primary Examiner—Robert L. Richardson
Attorney, Agent, or Firm—David M. Woods

[57] ABSTRACT

In editing video still pictures, the pictures are reproduced from a video disk and displayed one by one in combination with subject-matter categories into which they may be grouped. The list of categories appears as a descriptive overlay on each picture being evaluated. Ordinarily, some pictures are assigned to categories and some are skipped. It often happens that it is necessary to reevaluate the pictures that were skipped during the initial stage of evaluation. To encourage such a reevaluation, a special editing feature is provided for retrieving and redisplaying only those pictures that were not initially assigned to a category. Since these pictures are not intermixed with those already assigned to categories, they are quickly retrieved and conveniently assigned, if desired, to one or more of the subject-matter categories.

3 Claims, 11 Drawing Figures

METHOD FOR RETRIEVING UNEDITED VIDEO STILL PICTURES

BACKGROUND OF THE INVENTION

Cross References to Related Applications

This patent application is related to (A) commonly assigned, copending patent application Ser. No. 644,096, entitled "Video Disk Apparatus Providing Organized Picture Playback", (B) commonly assigned, copending patent application Ser. No. 644,097, entitled "Disk Container Supporting A Detachable Memory", and (C) commonly assigned, copending patent application Ser. No. 644,166, entitled "Method of Editing Video Still Pictures", all filed on even date herewith.

Field of the Invention

The invention pertains to a method for retrieving still pictures recorded on one or more video disks and for arranging their sequence of display.

Description Relative to the Prior Art

Video still imaging is a proposed form of imaging that offers the amateur photographer a convenient way of displaying a series of still pictures. A typical video still camera uses a small magnetic disk as its memory device (see "Electronic Still Camera" by Kihara, N. et. al. *Journal of Applied Photographic Engineering*, Vol. 9, No. 5, October 1983, 159-163 and "The Electronic Still Camera A New Concept in Photography", by Kihara, N. et. al. *IEEE Trans on Consumer Electronics*, Vol. CE-28, No. 3, August 1982, 325-330)). A companion player is envisioned which, when a recorded disk is inserted into it, converts the signals recorded on the disk into a television signal from which the display is generated. A playback head in the player is arranged so that it can move either toward the outside of the disk or toward the center of the disk so that the pictures may be displayed in any sequence. A microprocessor is included in the player and instructions may be entered via a keyboard as to the desired sequence. Moreover, a particular sequence would not have to include all of the pictures on the disk, that is, the sequence may be obtained by selecting a collection of pictures pertaining only to some subject of interest to the viewer.

Such a picture collection is relatively small since a video disk only contains, for example, twenty-five full-frame pictures or fifty single-field pictures. Editing, that is, specification of the display sequence, is relatively manageable for such small numbers of pictures. However, video disks, being quite compact, lend themselves to organized storage in groups. (See U.S. Pat. Nos. 4,271,489 and 4,132,469 for examples of group storage of optical disks and photographic disks, respectively). Accordingly, it is desirable to display them in multi-disk groups. For a thirty-disk container, this means that a suitable player could access as many as 1500 pictures. With so many pictures, it is especially desirable to separate the pictures into categories of like image content, that is, to edit the pictures into picture albums and the albums into a video picture file.

Editing such a large collection of pictures into several categories is a challenging task. It ordinarily requires a lot of effort and attention to correctly dispose of the pictures ... including an initial effort to settle on certain "rules" for assigning pictures to one category rather than another. The task seldom can be completed at one sitting. What often happens is that part-way through the task the mental "rules" used for assigning the pictures to specific categories come into question. Maybe the events initially associated with the categories begin to merge and overlap (in the viewer's mind) or some categories begin to absorb disproportionate numbers of pictures. Maybe, in view of later pictures, some decisions to skip earlier pictures are plainly wrong. Sometimes the viewer would just like to double check to ensure that all pictures have been edited. Whatever the reason, the viewer wants to stop and look again at what has been done with the pictures. To simply display and review the pictures already assigned to a category is easily done, since these pictures are already grouped by category. But the question usually troubling the viewer relates to pictures that were skipped. Getting to these pictures—unassigned to any category—presents a problem. The viewer has to start over and look at all the pictures again, both the pictures assigned to a category and the pictures that were skipped. With 1500 pictures in the collection, this is so laborious—and repetitive—as to preclude doing it. As a result, the first effort at editing is ordinarily the last.

SUMMARY OF THE INVENTION

The invention as claimed offers a far less laborious solution to this problem. After assigning some of the pictures to one or more selected categories by subject-matter, it is recognized that the user will often need to take another look at pictures that were not assigned on the first pass. Such pictures may be unassigned to any category or unassigned to a particular category in question. According to the invention, only those pictures not initially assigned to one or more selected categories are redisplayed and reevaluated. Then the redisplayed pictures may be assigned, as desired, to the one or more selected categories. The advantage of editing the pictures in this manner, according to the invention, is not so much the labor reduction by itself as the increased convenience of editing unassigned pictures and, consequently, the increased likelihood that the viewer will be inclined to do it.

BRIEF DESCRIPTION OF THE DRAWINGS

The invention will be described with reference to the figures, wherein.

DETAILED DESCRIPTION OF THE PREFERRED EMBODIMENT

Figure 1:
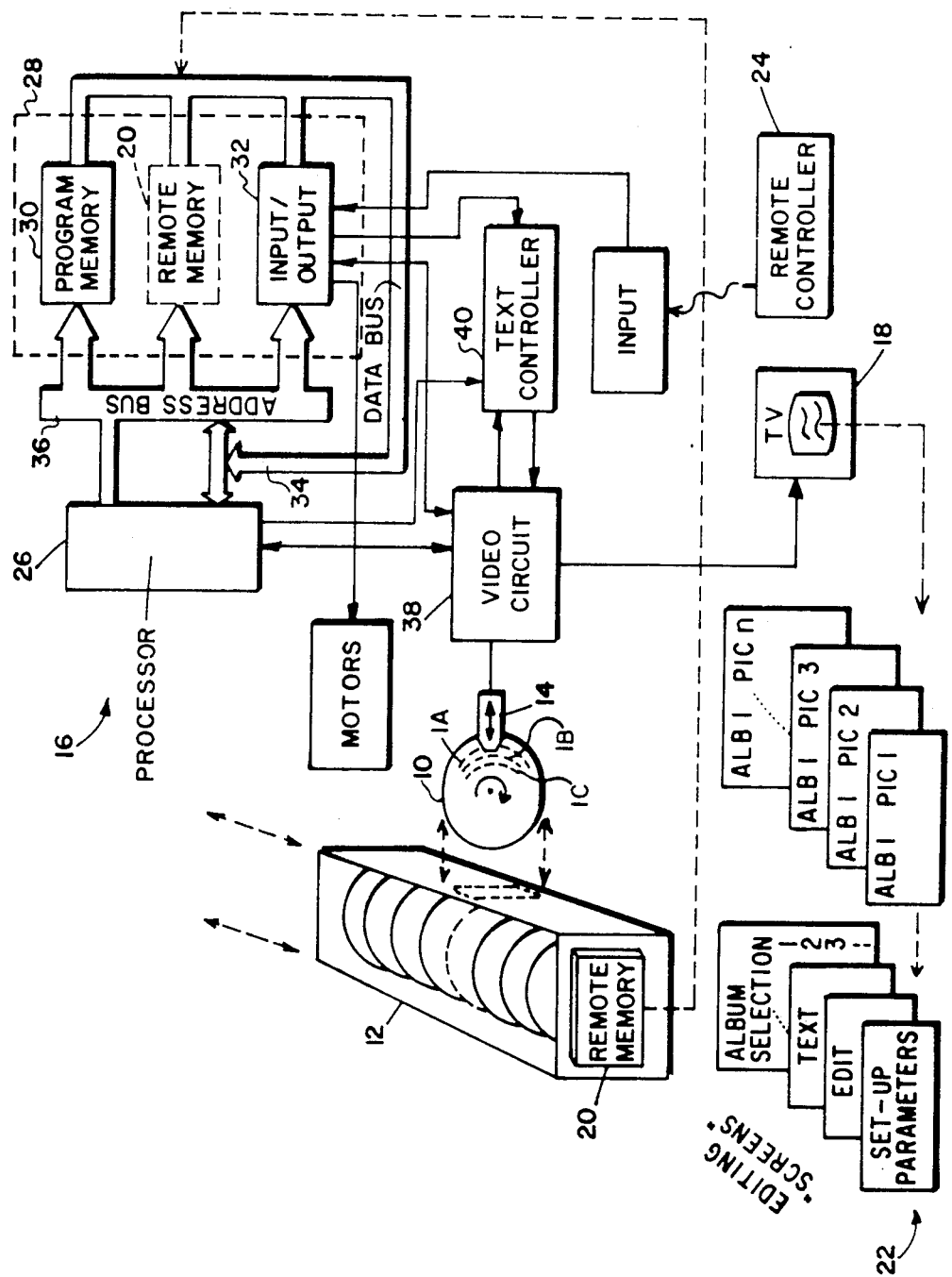
FIG. 1 is a schematic overview of video apparatus useful with a plurality of video disks having pictures arraged ino a video picture file.

It is helpful to initially consider a schematic overview of a video disk player useful with a plurality of video disks organized into a video picture file. Such a player is shown by FIG. 1 and also described in detail in related patent application (A), Ser. No. 644,096. In FIG. 1, a video disk 10 has been automatically removed from a container 12 storing, say, thirty such disks. The disk may be optical or magnetic, rigid or floppy. The disk 10 has many concentric video tracks 1A, 1B, 1C . . . , each storing one picture. Fifty such tracks, and fifty pictures, are typically placed on the disk. A playback head 14 is seen adjacent one of these tracks. (Ordinarily the disk 10 will be contained in a protective cartridge, which is not shown here.) A player circuit 16, shown as a block diagram, reproduces each picture for display on a television 18 according to a particular arrangement prescribed by the display attributes of the video picture file.

Data necessary for establishing the video picture file is contained in a remote memory 20 appended to the container 12. The remote memory 20 may be a solid state device attached to the container 12 as a separate element as shown by FIG. 1. It may also be a magnetic stripe formed on the container 12 or a removable element, say one of the disks, taken from the container 12 when it is in the player. In related patent application (B), Ser. No. 644,097, the remote memory 20 is shown as a detachable memory module containing one or more electrically-erasable programmable read-only memories (EEPROMs).

The remotely-stored data includes display attributes initially obtained by editing the pictures, that is, by assigning the pictures to one or more of, say, twenty albums or categories of like image content, by rearranging the viewing order (from the order on the disks), by skipping some pictures, by adding text to the assigned pictures, by setting individual viewing times, and so on. The viewer communicates with the player circuit 16 by observing editing "screens" 22 produced on the television 18, which provide a guide to selections, and then entering a decision via an infra-red remote controller 24.

The video picture file data is stored in the remote memory 20 and remains there though the container 12 is removed from the player. To view an album, the container 12 is inserted into the player and the remote memory 20 is connected into the player circuit 16. An album is selected by observing album selection "screens" generated from the picture file data and pressing appropriate buttons on the controller 24. The pictures are then obtained in a rearranged order according to the particular album by accessing the disks, and the picture tracks on the disks, in a rearranged sequence—that is, a sequence unlike the order of disks, and tracks on the disks, as stored in the container 12. Viewing then proceeds automatically through the album according to the preselected display attributes with the viewer essentially unaware of the particular disks and tracks being accessed. The most the viewer does is to advance from one picture to the next by depressing an appropriate button on the remote controller 24.

The player circuit 16 includes a digital processor 26 that operates by means of programs and data stored in a memory array 28. The memory array 28 includes a set of read-only memories (ROMs) 30 for storing the operating programs and a word library for text generation. Read and write memories include the aformentioned remote memory 20 and inputoutput (I/O) space 32 for memory-mapped I/O, that is, an area of memory space dedicated to memory addresses that are actually used to address peripherals (such as motors and sensors). Each memory in the array 28 is connected to an address bus 36 and a data bus 34.

The processor 26 also interchanges data with a video circuit 38, which processes video and control data either read from or written on (i.e., applied to) the video disk 10. The processor 26 is also connected to a text controller 40, which generates the aforementioned "screens". The digital processor 26 operates the player by coordinating signals from a variety of input sensors, including the remote controller 24 and the head 14, with commands to a variety of output devices, including the motors (not shown) that move the container 12 in the player, remove the disk 10, position the head 14, and rotate the disk 10. The display to the television 18 is provided by switching the video circuit 38 line-by-line between a picture signal from the head 14 and a text signal from the text controller 40.

The organization of the pictures into a video picture file is reduced to a manageable task by partitioning the editing procedure into several levels according to related patent application (C), Ser. No. 644,166. The editing procedure involves a variety of the aforementioned "screens"; viewer selections are made from the remote controller 24 based on messages on the "screens". Before describing in detail the "screens", and the circuits and techniques for implementing and using them, it is helpful to recognize the part the method according to the invention plays in the overall editing procedure. Once editing commences, by a command initiated from the controller 24, a "set-up screen" shows on the television monitor 18. The "set-up screen" offers the viewer an opportunity to review and change certain display parameters (described in detail later) that apply for all the pictures The "set-up screen" also includes a particular parameter that, when selected, takes the viewer to the next step of editing, (by way of the "menu screen", which will be explained later). The various editing levels then appear on the television 18. Two are of particular interest: the "disk edit" level and the "picture edit" level. Categorizing the pictures into albums is done by virtue of the "disk edit" level. Engaging this level causes the processor 26 to retrieve the first picture from a selected disk in the container 12. The picture is reproduced along with a descriptive overlay showing the available albums. The viewer inspects the picture and selects the album deemed appropriate for that picture. When the selection is made, the album assignment for the picture is entered into the remote memory 20. This procedure continues for each of the pictures.

As often happens, the viewer would like to look again at the pictures which were skipped (i.e., unassigned to an album) in the initial pass through the "disk edit" level. It is of course possible to start the "disk edit" level all over again. The previous assignments—or lack thereof—will show on the descriptive overlay. However, according to the invention, a much more convenient procedure is provided by the "picture edit" level. Engaging this level causes the processor 26 to retrieve the first picture from a selected disk that is unassigned to any album. As with the "disk edit" level, the picture is reproduced with an album overlay and the appropriate album may be selected. But now the viewer only has to contend with the pictures that were skipped. In the preferred embodiment of the invention, the "picture edit" level causes the selection of only those pictures unassigned to any album. As will be shown, the selection of one or more of up to twenty albums for each picture is provided. With so many albums, it may be helpful if the "picture edit" level is capable of selecting those pictures unassigned to one or more selected albums. The invention as claimed is intended to cover this eventuality. Thus, the entering of the "picture edit" level may include the specification of one or more excluded albums and then the selection of only those pictures unassigned to the excluded albums. (The preferred embodiment therefore represents the specification of all albums as excluded and then the selection of those pictures unassigned to all albums.)

Figure 2A:
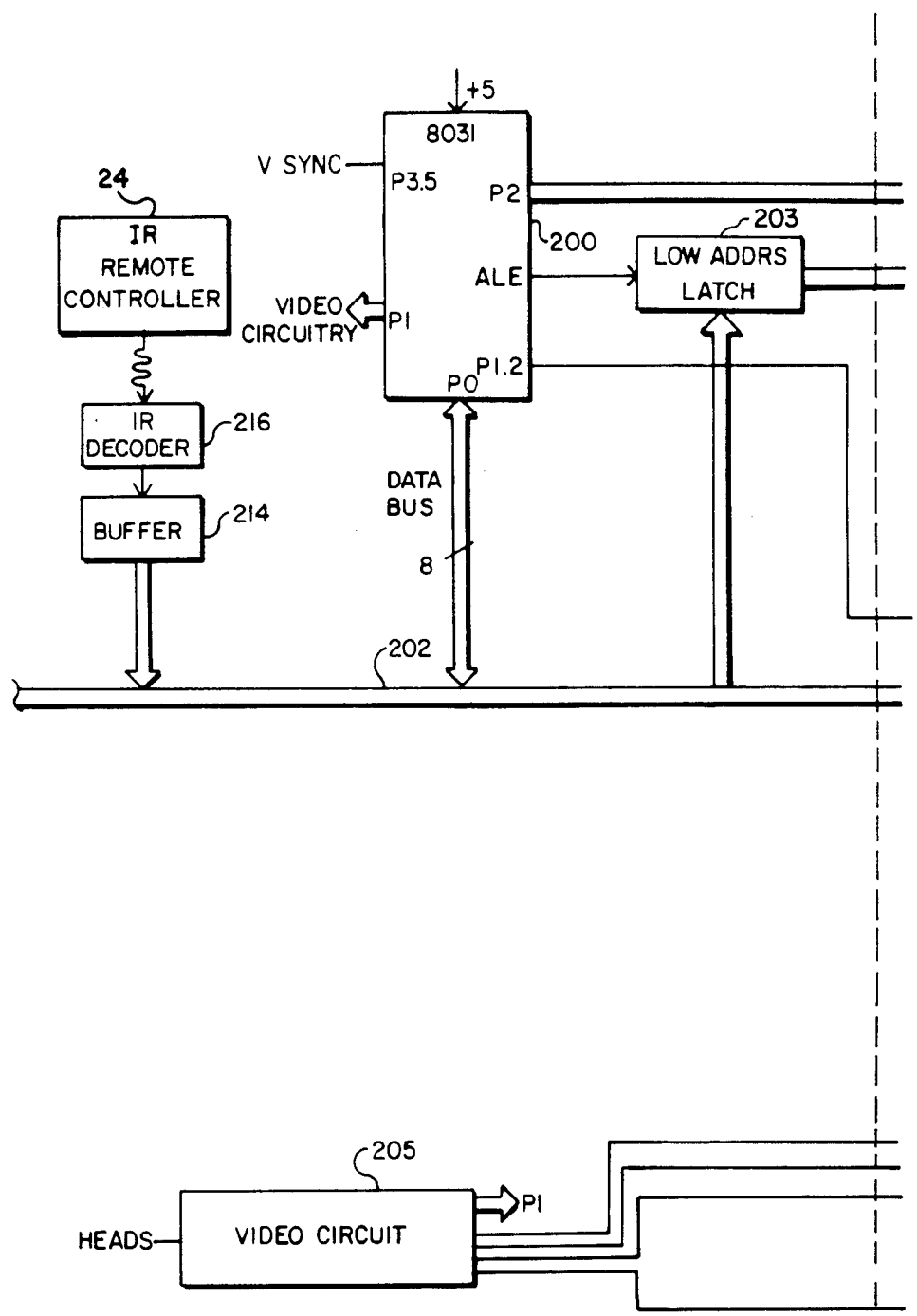
FIGS. 2A and 2B show a detailed circuit diagram for the player circuit shown by FIG. 1.
Figure 2B:
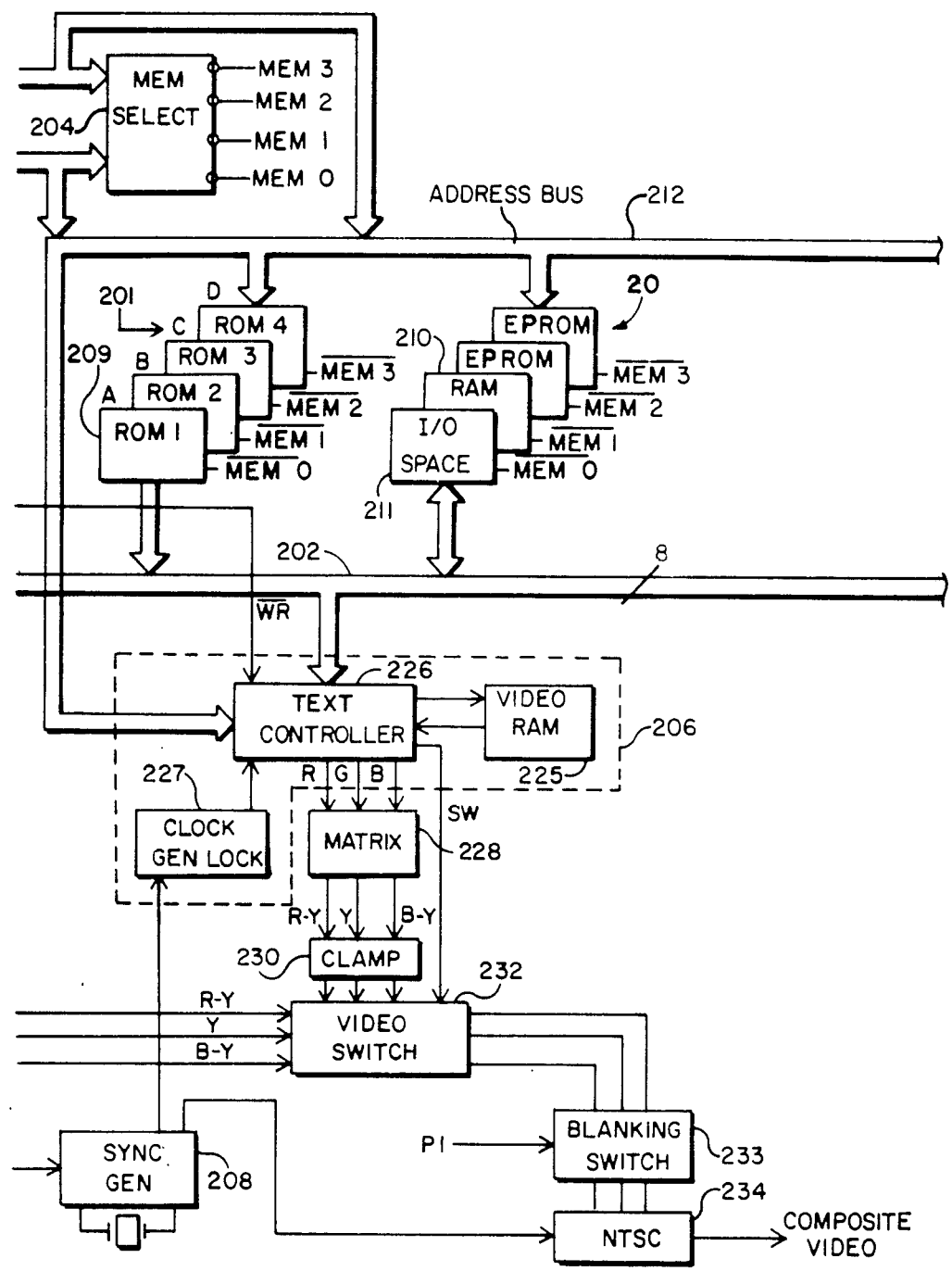
Figure 3:
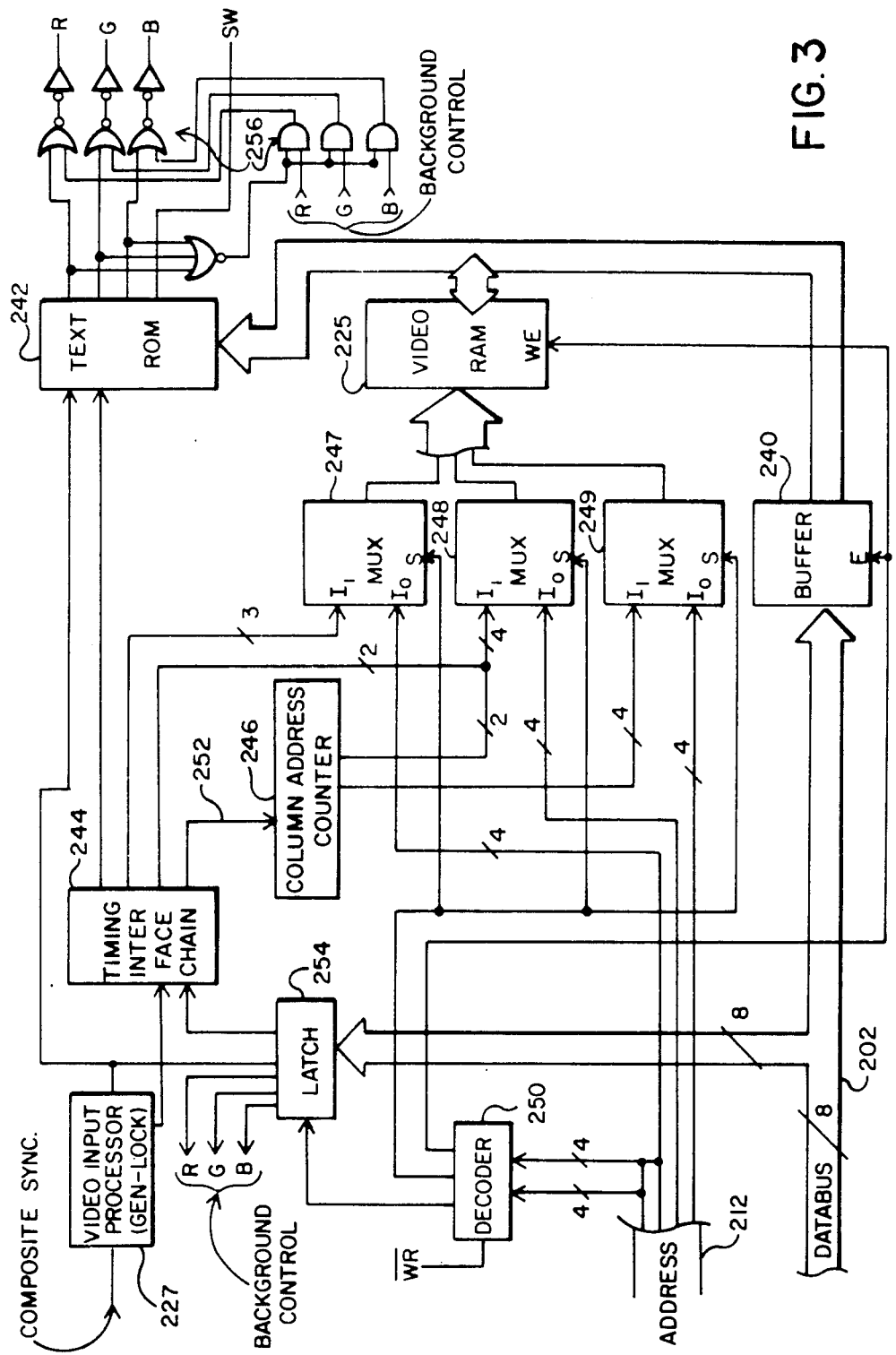
FIG. 3 is a detailed schematic diagram of the video text generator shown as part of the circuit diagram in FIG. 2B.

The player circuit 16 shown in FIG. 1 is further represented in detail by the circuit of FIGS. 2A and 2B. FIG. 3 provides further detail on certain features of the text generator shown in FIG. 2B. To aid in understanding certain parts of these Figures, some circuit elements are described as specific devices, including specific device nomenclature; however, other standard circuit devices may be readily substituted for such named devices.

The player circuit is organized around a microcomputer 200, such as the 8031 microcomputer manufactured by the Intel Corporation, and a memory array 201 including a pair of EEPROMs forming the memory devices in the remote memory 20. The 8031 microcomputer has 32 inputoutput (I/O) lines configured as four 8-bit parallel ports, labelled P0, P1, P2 and P3 —and subdivisions thereof, e.g., P1.0 for the first line of the eight-bit port P0, P1.1 for the second line and so on. Port P0 connects to an 8-bit data bus 202 and provides for multiplexing both a low-order address byte and data onto the bus. The low-order address byte is latched off the data bus 202 and put on a 16-bit address bus 212 when a low address latch 203 is enabled by the address latch enable (ALE) line of the microcomputer 200. The high-order address byte is provided by the eight-line port P2 to the address bus 212 and a memory select decoder 204. One of the four outputs—MEM 0 to MEM 3—of the decoder 204 is driven low by the condition of the address lines put into the decoder 204. The outputs MEM 0 to MEM 3 connect to the chip enable input of respective memories within the memory array 201 and, when low, activate the respective memories for a readwrite operation. The particular memory selected is a function of the output of the decoder 204 and the conditions of additional lines (not shown) from the microcomputer 200, i.e., the external data memory read and write strobe lines and the program store enable line.

The memory array 201 includes a set of read-only memories (ROMs) 209A ... 209D for storing the operating programs and a word library for text generation. Read and write memories include the aforementioned EEPROMs in the remote memory 20 (as disclosed in related patent application (B), Ser. No. 644,097), a random-access memory (RAM) 210 and inputoutput (I/O) space 211 for memory-mapped I/O. Each memory in the array 201 is connected to the address bus 212 and to the data bus 202. ROMs 209A to 209D and the RAM 210 have, for example, 2K×8 or 4K ×8 capacities. Depending on the capacity needed for the remote memory 20, the capacities of the EEPROMs may be 2k ×8 (for example, provided by a Xicor X2816A device) or 8K ×8 (for example, provided by a Xicor X2864A device).

The eight-bit port P1 of the microcomputer 200 serves several purposes in the player circuit. Several lines are used to interchange data with a video circuit 205, which processes video and control data either read from or written to the magnetic disk 14. The video circuit 205 is conventional; since it is not crucial to a description of the editing method according to the invention, it will not be described in detail. One bit of the port P1 —P1.2—forms a write (WR) pulse to a text generator 206. The fourth eight-bit port P3 serves various special functions characteristic of the 8031 microcomputer, including that of two 16-bit timer/counters incorporated within the chip and the read and write strobe lines (mentioned earlier). Port P3.5 receives vertical synchronization pulses from a sync generator 208 connected to the video circuit 205.

Input data regarding the condition of the remote controller 24 is asserted onto the data bus by a buffer 214. The remote controller 24 has the following control buttons:
Frame Forward
Frame Reverse
Cursor Up
Cursor Down
Select
Exit
On/Off Pressing a button on the controller 24 applies a corresponding infra-red signal to an infrared decoder 216, which senses and decodes the infra-red signal and conveys the decoded signal to the buffer 214. Several buttons serve multiple functions depending on the condition of the player circuit 16. That is, pressing such a button means one thing at one time and another thing at another time. For example, the up/down buttons move a cursor when the player circuit is involved in editing while, at other times, the same buttons move the container 12 forward or reverse in the player. The buffer 214 is enabled by lines (not shown) from the microcomputer 200 at the appropriate moment, at that time asserting its input states onto the data bus 202. (Other input signals regarding the condition of the player come from various sensors associated with parts of the player. Output signals for operating various motors are also latched off the data bus 202. These sensors and motors, and associated circuitry, are discussed in detail in related patent application (A), Ser. No. 644,096).

The text generator 206 comprises a video RAM 225, a text controller 226 and a clock-gen lock circuit 227. (A gen lock circuit is a conventional system of regenerating synchronizing pulses and a master clock from a composite video source.) The text generator 206 assembles, according to instructions from the microcomputer 200, text messages for display on the television 18 as the aforementioned "screens". The text controller 226 generates red, green and blue line scan (RGB) signals and a switching signal SW. The RGB signals are connected to a conventional matrix circuit 228, which generates two color-difference signals R-Y and B-Y and a luminance signal Y. The dc component of the color difference signals R-Y and B-Y and the luminance signal Y is restored by a clamp 230, which cause the black tips of the signals to be fixed at a predetermined level. The clamped signals—representative of text—are introduced to a video switch 232, which also receives picture signals from the video circuit 205. The switching signal SW from the text controller 226 determines which set of video signals the switch 232 will transmit, i.e., text video or picture video. The transmitted signals are put through a blanking switch 233 to an NTSC generator 234, which puts out a composite video signal in NTSC format suitable for connection to, and viewing on, the television 18 (FIG. 1). The blanking switch 233, which is controlled via port P1 of the microcomputer 200, cuts the video out when cartridges are changed, thus ensuring a blank (black) screen.

FIG. 3 is a detailed illustration of the text generator 206 shown in FIG. 2B. The video RAM 225 has capacity for 24 lines of text, each line having 40 columns of characters. The text data is partially assembled into word segments in a word library stored in one or more of the ROMs 209A, B, C or D (FIG. 2B). The word segments are connected together to form a particular message by conventional text programming of the microcomputer 200. A stream of the assembled and connected word segments are passed through the data bus 202 to a buffer 240, which—when enabled—presents the stream of word segments to the video RAM 225. Address locations for writing these word segments into the video RAM 225 are generated by the text program and asserted onto the address bus 212. The text message stored in the video RAM 225 is read out to a conventional text ROM (TROM) 242, such as a Phillips SAA5055. The text ROM 242 generates the dot pattern necessary for displaying the message on a television screen. The row/column addresses for reading out the message from the video RAM 225 are generated by a timing interface chain 244, such as a Phillips SAA5025, and a column address counter 246.

Since two sets of addresses are provided to the video RAM 225, one for writing word segments in and another for reading them out in a line scan sequence, it is necessary to keep them distinct and switch them to the video RAM at the proper time. A set of multiplexers 247, 248 and 249 provide that function. Twelve address lines, in 4-bit groups, are brought from the address bus 212 to respective $I_o$ inputs of the multiplexers 247, 248 and 249. Eleven address lines, in 3 groups, are brought from the timing interface chain 244 and the column address counter 246 to the $I_1$ inputs of the respective multiplexers 247, 248 and 249. The proper time for switching between the $I_o$ and $I_1$ inputs is determined by a dual 1-of-4 decoder 250, which takes for its input two 4-bit wide inputs from the address bus 212. When set accordingly by the microcomputer 200, these two 4-bit inputs trigger the switch (S) inputs to the multiplexers 247, 248 and 249 and the enable (E) input to the buffer 240. At this time the write addresses from the address bus 212 are presented to the video RAM 225 and the stream of word segment data in the data bus 202 is written into corresponding storage locations. At other times, without the trigger pulse from the decoder 250, the read addresses from the timing interface chain 244 and the column address counter 246 are coupled through the multiplexers 247, 248 and 249 to the video RAM 225 and the stored word segment data is sent to the text ROM 242. The row address is set by five lines from the timing interface chain 244; at the same time a clock signal on the line 252 triggers the column address counter 246. The column addresses are then counted out for the 40 columns of a row by the column address counter 246 which, at the end of the line, is reset to start over on the next line, and so on through the 24 lines.

It is necessary to lock the text message to the timing of the picture video. This is done by the gen-lock circuit 227, which in FIG. 3 is shown to be a video input processor chip, such as a Phillips SAA5030. It is also desirable that the text generator 206 only control the video display during that part of the overall display time for which there is actual text. Ordinarily actual text may occupy only a small part of the available picture display; other parts of the display are devoted to, for example, display lines that separate lines of text. At these times, when no text is being shown, it is desirable to fill in the remaining display area with, say, an appealing color. This is done by latching a "no-text" color signal off the data bus when a latch 254 is clocked by a line from the decoder 250. This signal consists of "background" red, green and blue signals which are substituted for the R, G, B signals from the text ROM 242 during that part of the display time for which there is no text. The substitution is made by a configuration 256 of AND, NOR and inverting gates when the output lines of the text ROM 242 are simultaneously low (i.e., meaning no text signal is present).

The player circuit of FIGS. 2A and 2B controls the organization and use of the video picture file through operation of a video file operating system. This system steps the viewer through a prearranged sequence of operations. Several modes of operation are available, including the "set-up" mode, the "edit" mode, the "album viewing" mode and the "normal viewing" mode. Each mode interacts the viewer with the video file operating system. As discussed in connection with FIG. 1 such interaction is characterized by video messages put on the television 18 in the form of "screens". The description of the various "screens", when they are called up, and what the viewer does with them constitutes a list of requirements for the video file operating system, that is, a specification for the system. This specification is the basic document from which a computer program is written. A computer programmer of ordinary skill takes this specification and designs the appropriate program to fulfill the requirements set out therein. The statements used in the program will depend upon the approach taken by the individual programmer but the process is straight-forward and does not require experimentation in design.

The video file operating system first enters the "set-up" mode by displaying a "set-up screen" on the television. The "set-up screen" lists a choice of fundamental operating parameters that apply to all the pictures in the file, as follows:

| | | |
|---|---|---|
| SKIP FRAME | [ON/OFF] | (1) |
| PHOTO ID | [ON/OFF] | |
| TEXT | [ON/OFF] | |
| *PICTURE DATA | [ON/OFF] | |
| VIEW TIME | [ON/OFF] | |
| CONTINUE TO MENU | [ON/OFF] | |

The existing condition of the parameters is that last set by the viewer and stored in the remote memory 20. It appears on the screen as either the word "ON" or the word "OFF". Should the user wish to change a parameter, a cursor (shown as an asterisk "*") is moved adjacent the parameter to be changed, and the select button on the remote controller 24 is pressed. (The cursor is moved in any "screen" by pressing the up/down buttons on the controller 24.) Pressing the select button will either enable or disable the parameter and change "OFF" to "ON", or vice versa, depending on its prior status. Each time a set-up parameter is changed, the new condition is stored in the remote memory 20.

When the "skip frame" parameter is ON, the video file operating system will bypass any picture previously edited to "skip frame". When "skip frame" is OFF, all pictures will be displayed in the order that they appear on the disk, or in the album. When the "photo ID" parameter is ON, the disk number and the frame number of the current picture appear on the television with the picture. When OFF, they will not appear. When the "picture data" parameter is ON, the video file operating system will examine the picture track of the picture currently on display; any data embedded within the picture track (on a buried sub-carrier, for example) will be displayed with the picture. Such data is ordinarily placed in the track when the picture is taken, and may include the date on which the picture was taken, taking conditions, and so on. When "picture data" is OFF, the data does not appear. When the "text" parameter is ON, text messages associated with particular pictures—like titles or descriptions—are displayed. These text messages are stored in the remote memory 20; unlike picture data, such text messages are written into the memory 20 by an editing operation after the picture is taken. When the "view time" parameter is ON, and the player is in an album viewing mode, the video file operating system automatically displays each picture for a time previously selected and then advances to the next picture in the album. However, the present viewing time is overriden for a given picture by pressing the frame buttons on the controller 24. The last choice in the "set-up screen" is "continue to menu", which is an exit path that leads to the "menu screen" and enables the viewer to select a mode of operation.

The viewer sees the "menu screen" after exiting from the "set-up" screen. The "menu screen" lists the choices of operating modes, as follows:

|  |  |
| --- | --- |
| SET UP | (2) |
| *EDIT |  |
| ALBUM VIEWING |  |
| NORMAL VIEWING |  |
| MAGAZINE TO UNLOAD POSITION |  |

Each mode is selected by positioning the cursor and pressing the select button, just as before. The "set up" mode is the one just described; it may be desirable for the viewer to go back to it from time to time while interacting with the operating system. The "edit" mode permits the viewer to assign the pictures on the magnetic disks contained in the magazine to several albums and specify the aforementioned display attributes. The "album viewing" mode enables the viewer to select a particular album for viewing (of those already edited) while the "normal viewing" mode displays each picture without regard to album assignment. The last operating mode, that of "magazine to unload position", causes the magazine to cycle to its unload position so that it can be removed from the player. This mode is automatically entered when the OFF button is pressed on the remote controller 24. Pressing the exit button on the controller 24 at any time when the "menu screen" is not being displayed always returns the viewer to the "menu screen". The edit mode will now be considered in detail. The other three modes, as well as the "edit" mode, are described in detail in related patent application (C), Ser. No. 644,166.

The "edit" mode has separate levels of editing according to the disclosure in related patent application (C), Ser. No 644,166. When the "edit" mode is selected from the "menu screen", an "edit option screen" is shown, listing five editing levels and an exit path, as follows:

|  |  |
| --- | --- |
| *DISK EDIT | (3) |
| PICTURE EDIT |  |
| ALBUM EDIT |  |
| TEXT EDIT |  |
| RENAME ALBUM |  |
| EXIT TO MENU |  |

When the "disk edit" level is selected, a "disk selection screen" appears on the television with the following message:

|  |  |
| --- | --- |
| *Pressing select will begin Viewing Disk [#] | (4) |
| exit |  |

The disk number [#] is increased or decreased by repeatedly pressing the cursor up or down buttons on the controller 24. When the desired disk number comes up, the select button is pressed and the "edit screen" appears on the television. This "screen" shows a cropped portion of the first picture of the selected disk and an album menu overlayed over the bottom of the picture, as follows:

| PICTURE AREA | | | |
| --- | --- | --- | --- |
| *ALBUM 1 | ALBUM 9 | ALBUM 17 | (5) |
| ALBUM 2 | ALBUM 10 | ALBUM 18 | |
| ALBUM 3 | ALBUM 11 | ALBUM 19 | |
| ALBUM 4 | ALBUM 12 | ALBUM 20 | |
| ALBUM 5 | ALBUM 13 | SKIP | |
| ALBUM 6 | ALBUM 14 | VIEW | |
| ALBUM 7 | ALBUM 15 | EXIT | |
| ALBUM 8 | ALBUM 16 | | |

The album menu at the bottom of the picture includes a list of twenty possible albums to which the picture may be assigned, as well as certain other possible actions such as "skip", "view" and "exit". The albums to which the picture is already assigned are shown in a different color. A picture is filed in an album (or deleted from an already assigned album) by moving the cursor to the selected album name and pressing the select button; then the selection is stored in the remote memory 20. After completing any additional album selections, and storing them in the remote memory 20, the disk is stepped to the next picture by use of the frame advance buttons. Pressing the select button while the cursor points to "skip" enters the picture into the "skip frame" category already discussed in connection with the "set-up screen" (screen (1)). The "skip frame" selection is also stored in the memory 20. Pressing the select button while the cursor points to "view" causes the album menu at the bottom part of the screen to be replaced with the remaining part of the picture so that the viewer can see the entire picture before deciding which album(s) to put it in. Pressing the select button while the cursor points to "exit" returns the "edit option screen" (screen (3)) to the television so that the viewer can select a different level of editing.

In accordance with the invention, the "picture edit" level is used if the viewer wants only to look at pictures that have not been previously edited into an album. Pressing the select button while the cursor points to "picture edit" causes the "disk selection screen" (screen (4)) to appear on the television. After the desired disk number comes up on the screen, pressing the select button causes the first unedited picture on the selected disk to appear on the television. The picture is cropped with the album menu appearing at the bottom, as shown by the screen (5). The album selection process is identical to that of the "disk edit" level. Pressing the frame forward or reverse buttons will then increment the disk to the next unedited picture.

The "album edit" level is intended for use with pictures that have previously been edited into albums. At this level, the viewer indicates the order in which the pictures will be displayed, the order in which the disks are called, and a display time for each picture (the default order is chronological and the default time is 10 seconds). Pressing the select button when the cursor points to "album edit" causes the "album select screen" to appear on the television, as follows:

| AVAILABLE ALBUMS ARE | | |
|---|---|---|
| *ALBUM 1 | ALBUM 11 | (6) |
| ALBUM 2 | ALBUM 12 | |
| ALBUM 3 | ALBUM 13 | |
| ALBUM 4 | ALBUM 14 | |
| ALBUM 5 | ALBUM 15 | |
| ALBUM 6 | ALBUM 16 | |
| ALBUM 7 | ALBUM 17 | |
| ALBUM 8 | ALBUM 18 | |
| ALBUM 9 | ALBUM 19 | |
| ALBUM 10 | ALBUM 20 | |
| | EXIT | |

The available albums are listed on the "album select screen" (6). Pressing the select button with the cursor pointing to a selected album brings up a separate message (7) inquiring as to whether picture order, disk order or view time is being determined.

| *PICTURE ORDER | (7) |
|---|---|
| DISK ORDER | |
| VIEW TIME | |
| EXIT | |

Selecting view time causes each picture in the album to appear along with a numeric indication of the current view time. Pressing the cursor up or down buttons causes the numeric indication to cycle up or down through the available time selections. Pressing the frame advance or reverse button when the desired time is showing will enter the view time into the memory 20 and moves to the next or previous picture. Selecting picture order causes the picture numbers of the disk (i.e., those pictures in the selected album) to be displayed in the order in which they would appear in the album across the top of the screen (current order), as follows.

| 1 | 3 4 5 6 | 8 9 | 11 12 13 14 15 16 17 | 19 | (8) |
|---|---|---|---|---|---|
| | * | | | | |
| 2 10 18 7 | | | | | |
| * | | | | | |

A space is provided under the "current order" line for the "new order". The cursor is positioned along the "current order" line by using the cursor buttons. Pressing the select button when the cursor is underneath a particular picture number causes that picture number to enter the "new order" list in the next available spot. For example, screen (8) shows that "7" has just been moved to the "new order" list. In this way the current picture order is rearranged into a new picture order, which is stored in the memory 20. Selecting disk order causes a display similar to picture order except the identifying numbers of the disks assigned to the selected album, in the order in which the video file operating system will call them, are displayed instead of the picture numbers. The process of rearranging the order in which the disks are called up is the same as that for picture order rearrangement. The new order is also stored in the memory 20.

By means of the "text edit" level (of the "edit" mode) one line of text may be assigned to each picture and entered into the memory 20. The "rename album" level (of the "edit" mode) permits the viewer to select or change the name of one of the twenty albums in the video file operating system. The "text edit" and the "rename album" levels are described in detail in related patent application (C), Ser. No. 644,166.

The preceding description relative to the "screens"—and especially how the viewer interacts with them—forms the basis for programming the video file operating system. A programmer of ordinary skill can take this description and, in due course but without undue experimentation, produce the necessary program. In the past, the programmer would devise a set of charts (i.e., flow charts) showing the flow of control through the system as an aid in the step of programming. More recently, a different type of chart showing the flow of data through the system has replaced the traditional flow chart as an aid in designing the program. Whichever programming aid is used, their generation (from the specification) and use is within the capability of the ordinarily skilled programmer. The latter charts are called data flow diagrams; their design and use is part of what is referred to as structured systems design and is thoroughly discussed in such references as *Structured Analysis and System Specification* by Tom DeMarco, New York, NY: Yourdon, Inc., 1978, and *The Practical Guide to Structured Systems Design* by Meilir Page-Jones, New York, NY: Yourdon Press, Inc., 1980. While unnecessary for the ordinarily skilled practitioner of structured systems design, the general reader may benefit from a showing of some typical data flow diagrams for the video file operating system. For that reason the operating system for the player circuit is shown in part by FIGS. 4–10 in terms of a nested set of data flow diagrams.

Data flow diagrams present a network representation of a system from the point of view of the data, rather than the point of view of that which acts upon the data (i.e., as would be presented by a flow chart). Certain conventions are used in a data flow diagram, as follows. A "bubble" is used to portray a process, that is, a place where data is transformed. Named lines (called named vectors) enter and leave the "bubbles". The vectors portray a data path or flow and the names, which are defined in a data dictionary, represent the pieces of data flowing along the data paths. Two parallel lines portray a file or data base; its name is between the lines. Data flow diagrams can partition a system into levels (thus the name, leveled data flow diagrams or top-down analysis). The top level is composed of a context data flow diagram delineating the domain of the system. Each "bubble" in the context diagram is expanded into a child diagram, each "bubble" in the child diagram into a further child diagram and so on until a child level of unpartitioned "bubbles"—called functional primitives—is reached. The basic rule of construction is that every data flow entering and leaving the perimeter of a given child diagram must be represented in its parent diagram. Using the data flow diagrams, the data dictionary and the rules and objectives spelled out in the specification, it is a straight-forward matter to write the statements of the program executed by each "bubble". This may be done directly in the chosen programming language or by means of well-known intermediate steps such as structured English.

Figure 4:
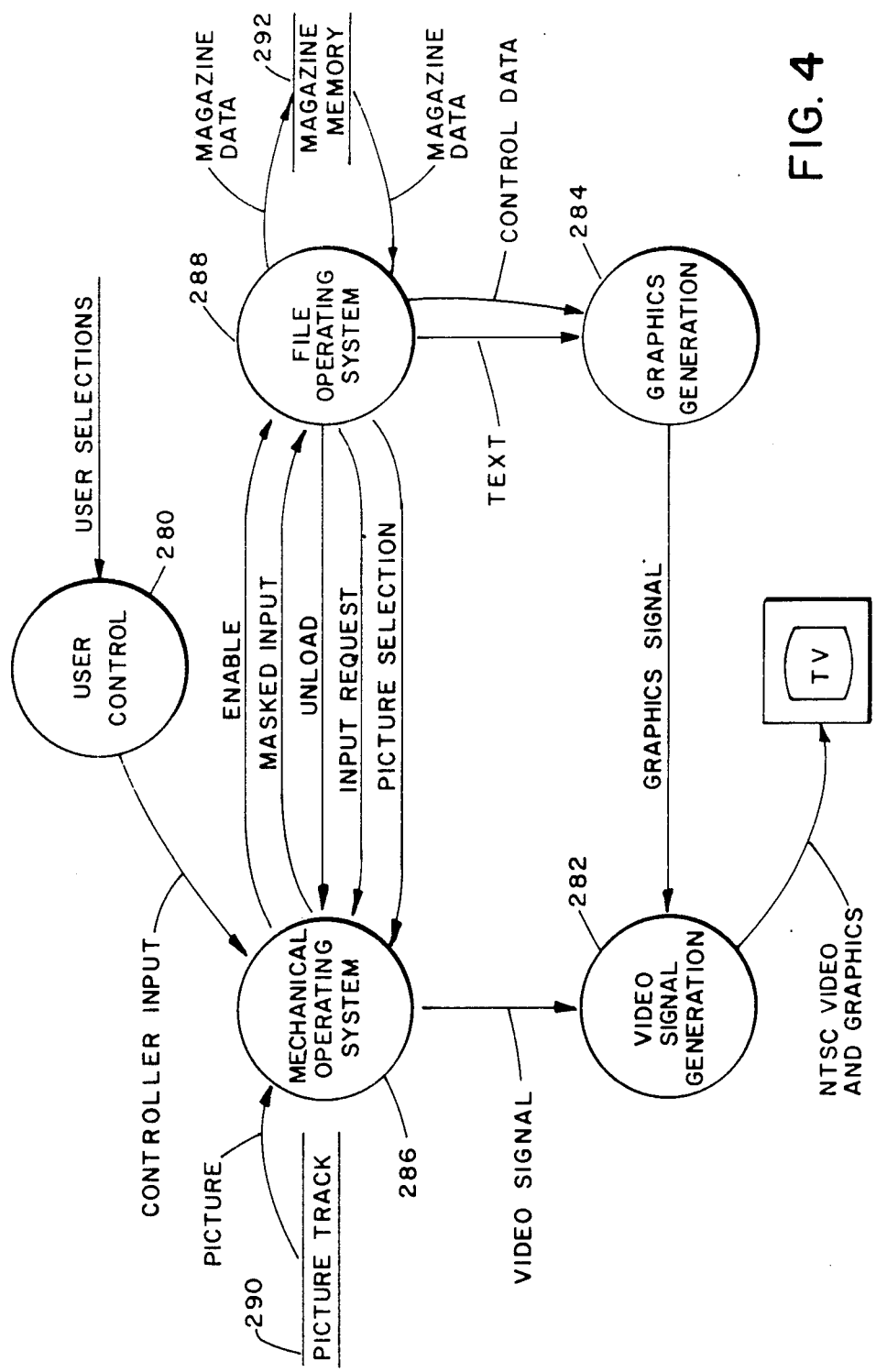
FIG. 4 is the overall data flow diagram for the circuit diagram of FIG. 2A and 2B.
Figure 5:
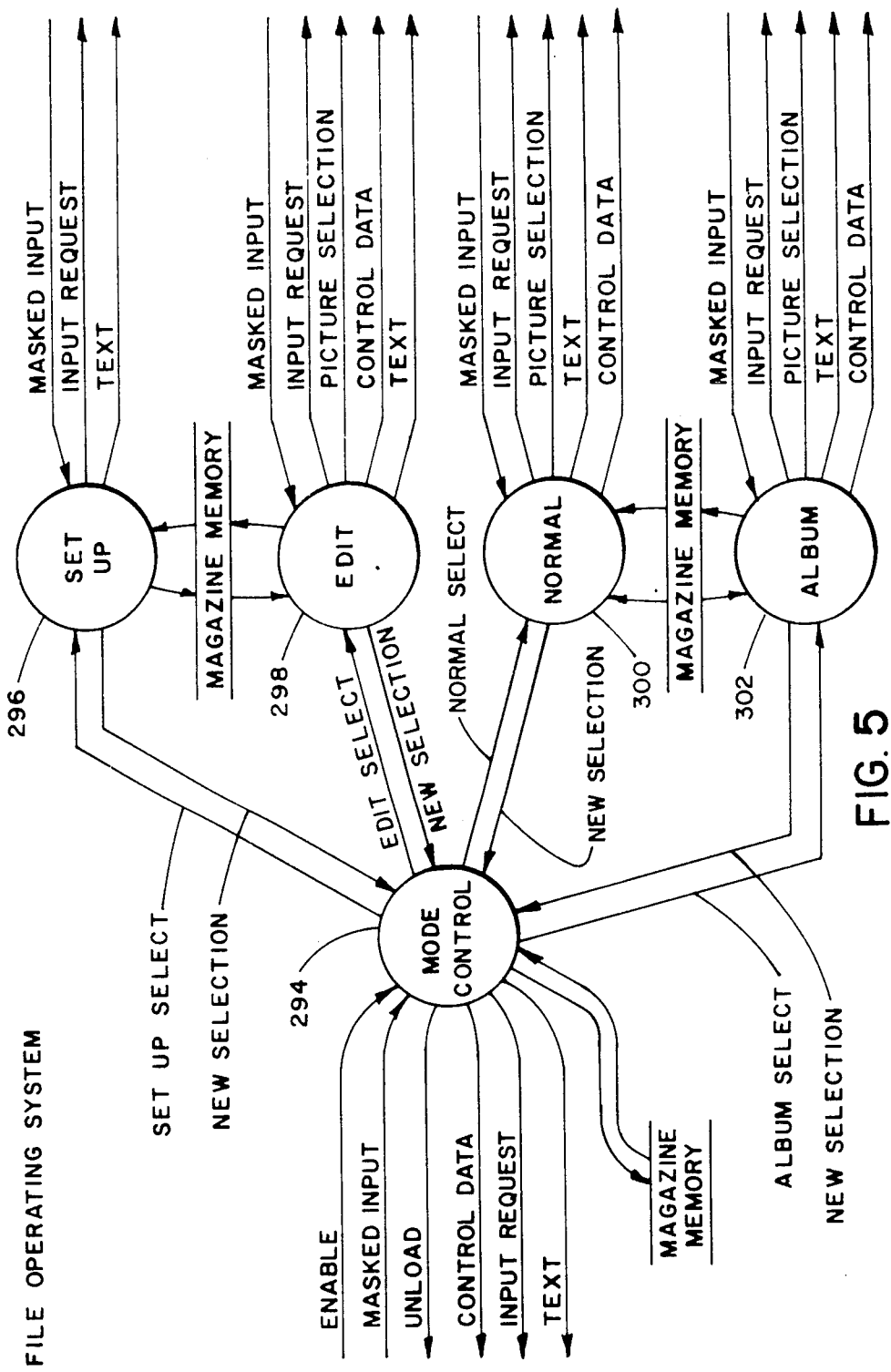
FIGS. 5-10 are lower level data flow diagrams of the file operating system shown by part of FIG. 4.
Figure 6:
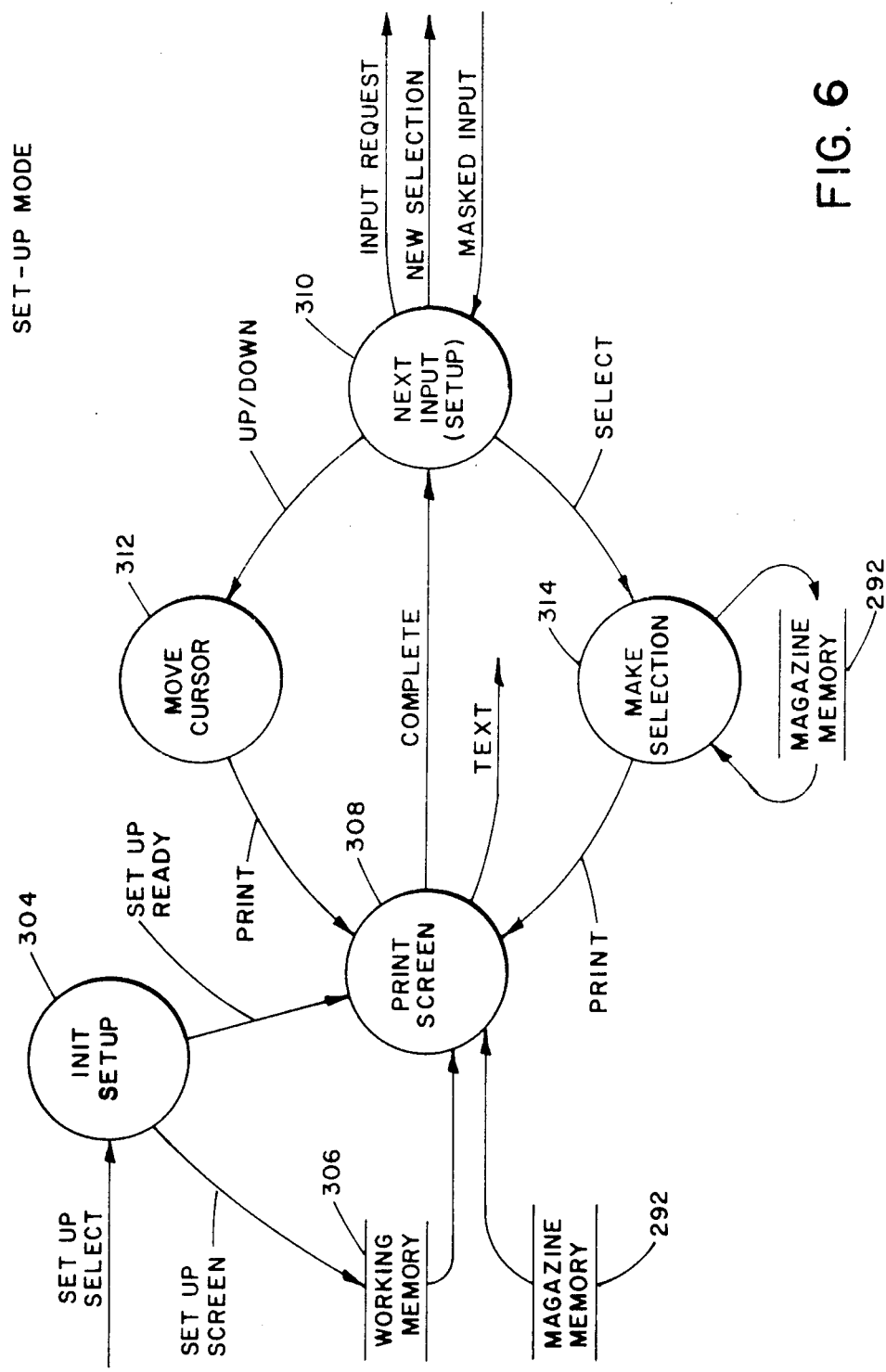
Figure 7:
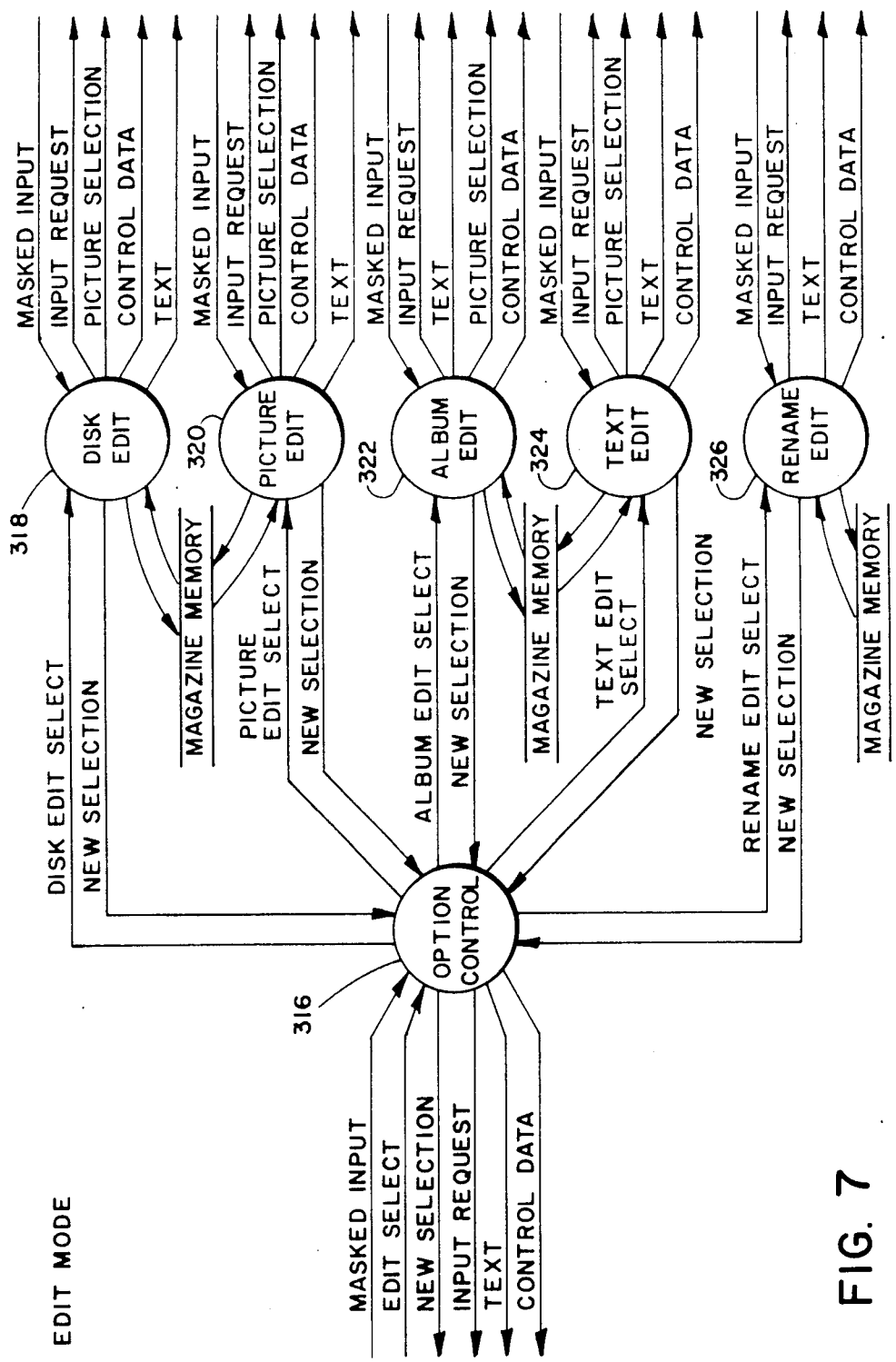
Figure 8:
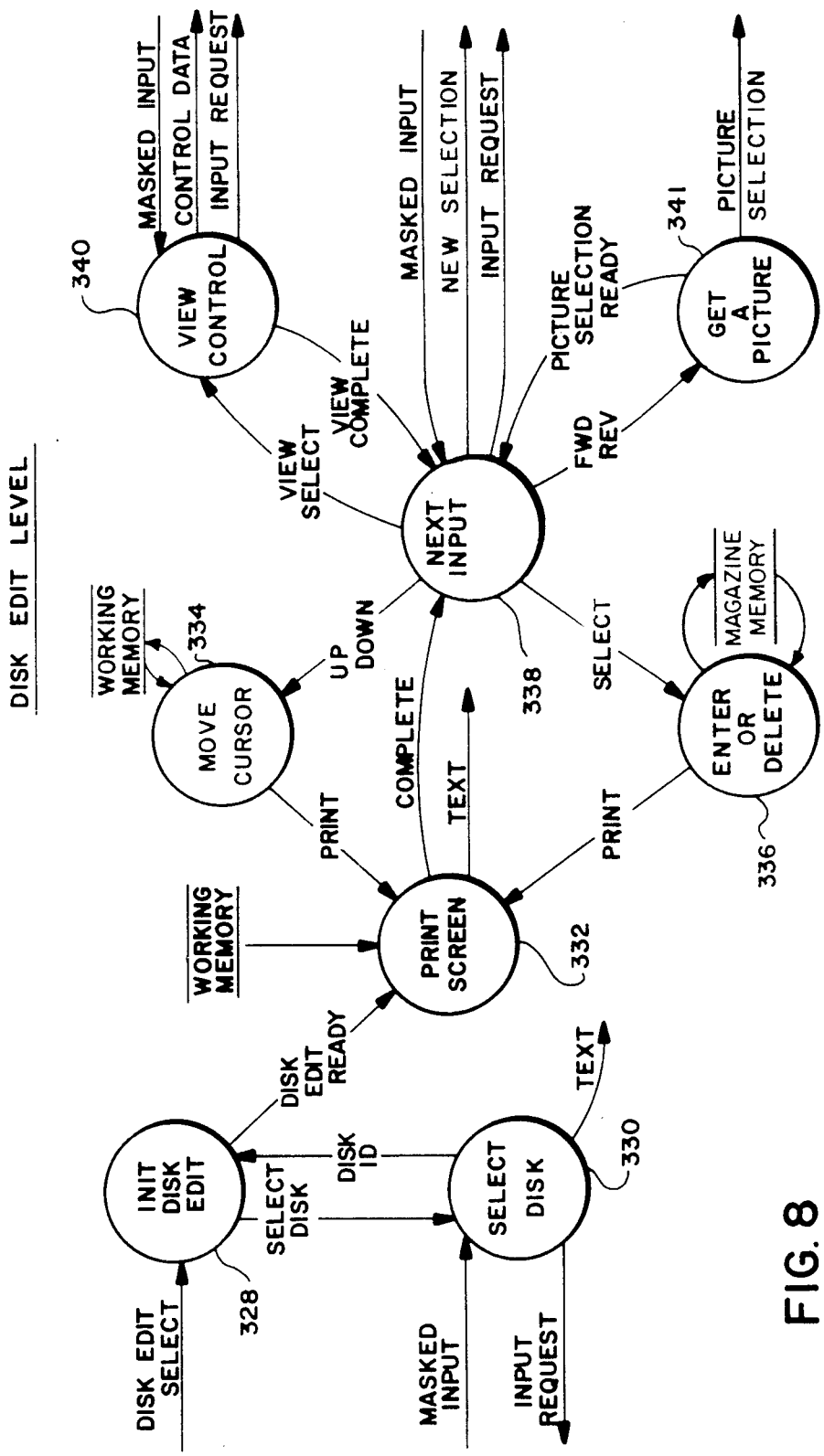
Figure 9:
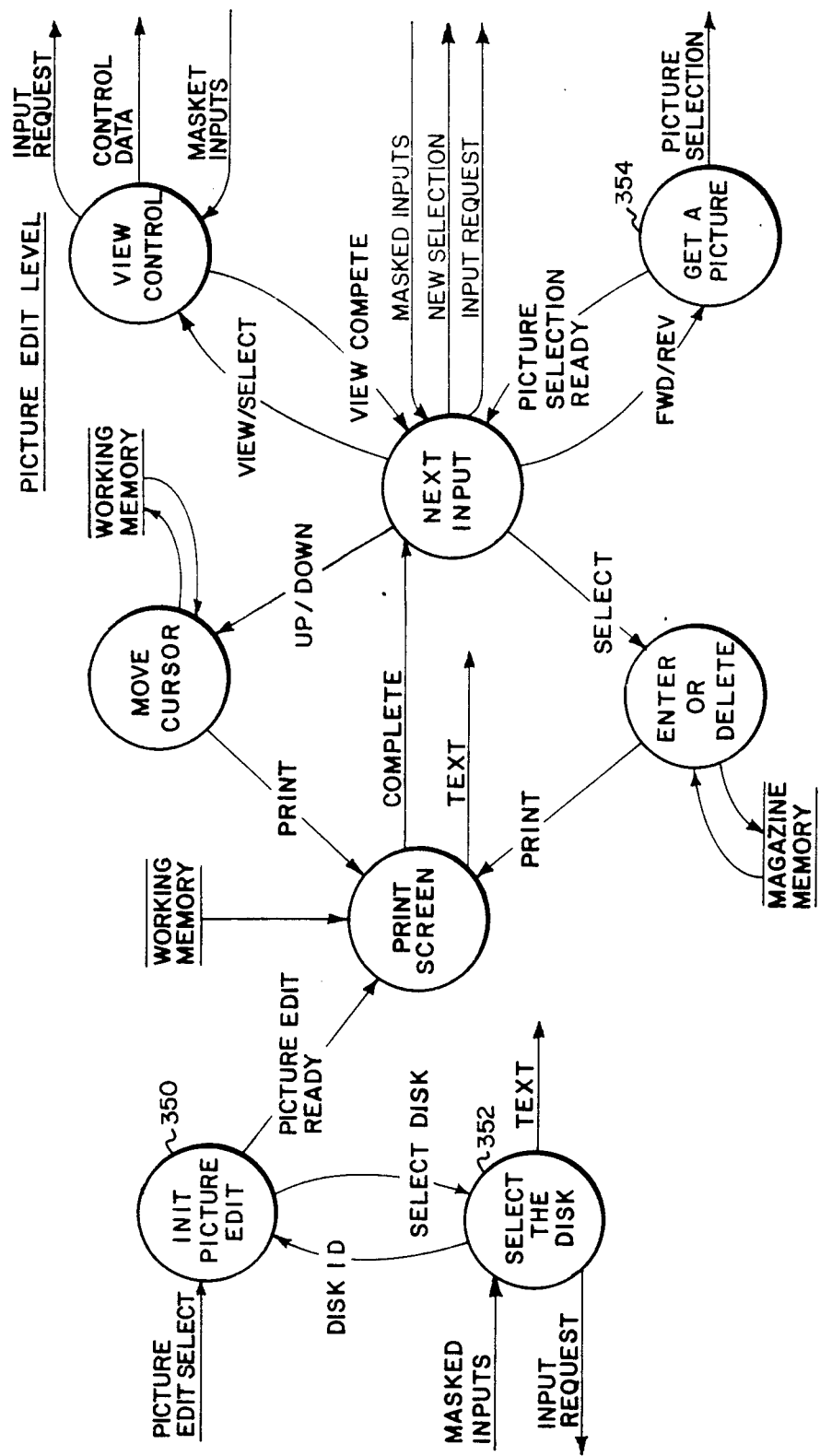
Figure 10:
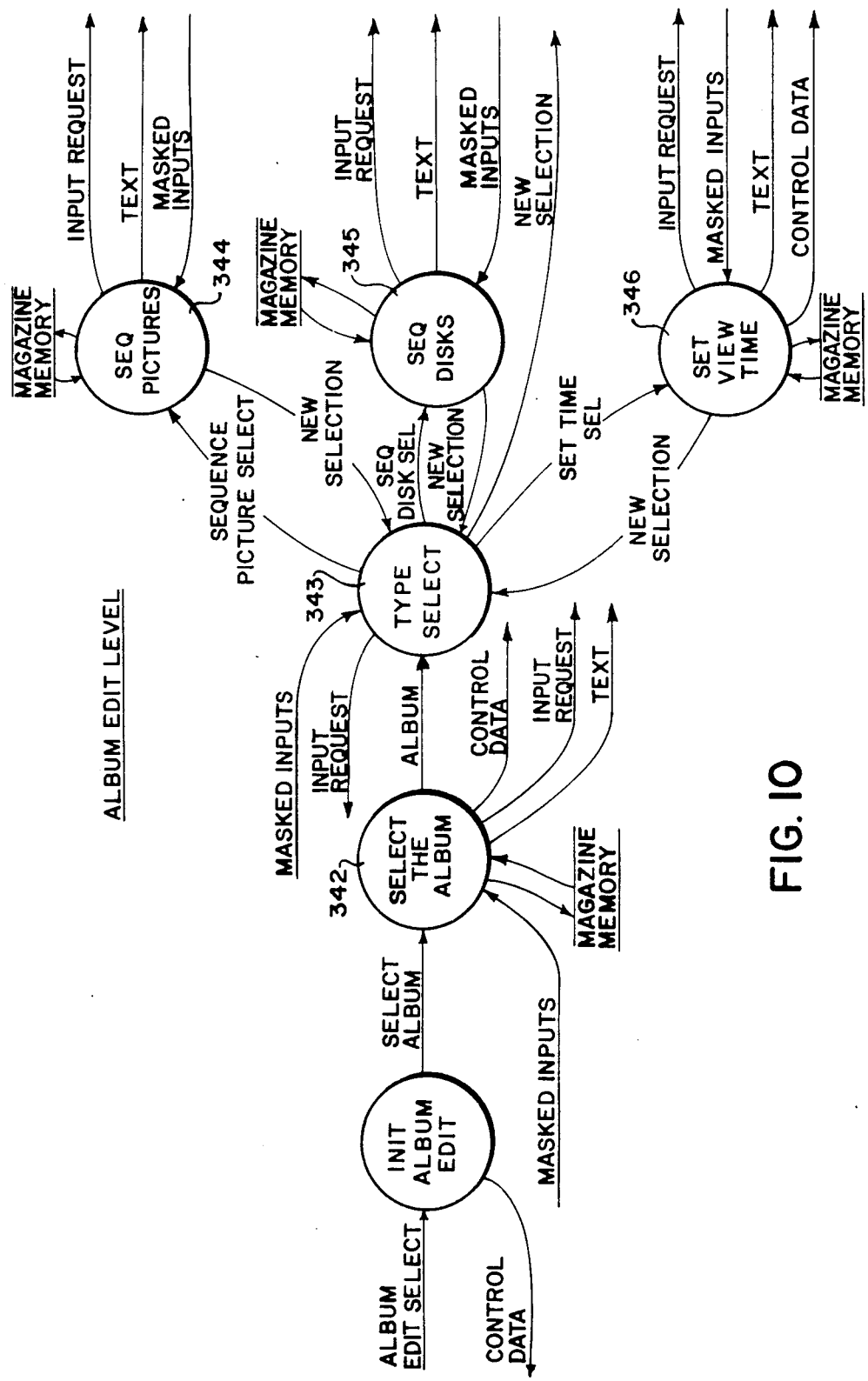

In terms of the above conventions, FIG. 4 is a context data flow diagram of the overall operating system for the video picture file portion of the video disk player. FIG. 5 is a level 1 child diagram expanding upon the file operating system "bubble" in FIG. 4 and showing the four modes of operation, that is, the "set-up", "edit", "normal" and "album modes". FIGS. 6 and 7 are level 2 child diagrams expanding upon two of the four modes show in FIG. 5. FIGS. 8–10 are level 3 child diagrams expanding upon three of the separate editing levels shown by FIG. 7. Table I (at the end of the specification) shows the data dictionary for the data names associated with the named vectors of FIGS. 4–10.

The data flow diagrams of FIGS. 4–10, in combination with the data dictionary listed in Table I, are self-explanatory to a programmer of ordinary skill in structured systems design. However, again for the general reader, some comments are helpful. Some of the process "bubbles" relate to circuit elements shown in FIGS. 2A and 2B. In the context diagram of FIG. 4, a user control process 280 includes operation of the remote controller 24, a video signal generation process 282 includes operation of the video circuit 205 and a graphics generation process 284 includes operation of the text generator 206. The mechanical operating system 286 and the file operating system 288 include operating programs stored in the memory 201 and executed under direction of the microcomputer 200. The picture track 290 and the magazine memory 292 correspond directly to operations involving the video tracks on the disk 10 and the remote memory 20 (FIG. 1), respectively. (In the following description, data names will be printed in capital letters and refer directly to like names in the data flow diagrams and the data dictionary.)

With regard to FIG. 4, USER SELECTIONS are received from the user control 280 via CONTROLLER INPUT to the mechanical operating system 286. The file operating system 288 requests the current status of CONTROLLER INPUT via an INPUT REQUEST to the mechanical operating system 286. The CONTROLLER INPUT is an 8-bit word indicating, by which bit is set, which button on the remote controller 24 is active (i.e., has been pressed). However, recalling the discussion of the "screens", not all buttons are active for a given screen. Therefore, the file operating system 288, which controls the "screen" being displayed, masks the INPUT REQUEST. In other words, though INPUT REQUEST accommodates all 8 bits of CONTROLLER INPUT, it is responsive to a selected subset of bits depending on the "screen" in use. The response back to the file operating system 288 is MASKED INPUTS, indicating which bit passed by the mask is active. If a passed bit is active, the file operating system 288 performs whatever function corresponds to the button that was depressed.

The "menu screen (2)" is produced by a mode control process 294 shown in the level 2 diagram of FIG. 5. The mode control process 294 triggers the four file operating modes previously described by appropriate SELECT signals, specifically by providing SET-UP SELECT to the set-up process 296, EDIT SELECT to the edit process 298, NORMAL SELECT to the normal process 300 and ALBUM SELECT to the album process 302. Control is returned to the mode selection process 294 by NEW SELECTION, which is generated by pressing select when the user is pointing to "exit to menu" in any of the "edit" mode "screens" or by pressing the exit button. FIGS. 6 and 7 show exemplary sub-level data flow diagrams for the the set-up process 296 and the edit process 298. The normal process 300 and the album process 302 are described in detail in related patent application (C) Ser. No. 644,166.

In the set-up process diagrammed by FIG. 6, an initialization process 304 starts the set-up process. SET-UP SCREEN initializes the text signals associated with the "set-up screen", which are stored in a working memory 306 (such as the RAM 210 in FIG. 2B). SET-UP READY causes the screen to print (print screen process 308), drawing upon previous conditions stored in the magazine memory 292. COMPLETE triggers the next input process 310, where the system waits for the next MASKED INPUT. The input will to be to move the cursor (process 312) by UP/DOWN or to make a selection (process 314) by SELECT. When a selection is made, it is stored in the magazine (remote) memory 292 in place of the previous selection. The user gets out of this loop by NEW SELECTION, which leads back to the menu screen (2).

In the edit mode shown by FIG. 7, editing is initiated by EDIT SELECT and the "edit option screen (3)" is then generated by the edit option control 316. The editing process is partitioned into five levels as shown in FIG. 7. The various SELECT commands determine which edit level is selected at any given time, as follows. DISK EDIT SELECT selects a first-level disk edit process 318, PICTURE EDIT SELECT selects a second-level picture edit process 320, ALBUM EDIT SELECT selects a third-level album edit process 322, TEXT EDIT SELECT selects a fourth-level text edit process 324, and RENAME EDIT SELECT selects a fifth-level rename edit process 326. The first through third-level processes are respectively described in detail by FIGS. 8–10. (The fourth and fifth-level processes are described in related patent application (C), Ser. No. 644,166.)

For the disk edit level shown by FIG. 8, the DISK EDIT SELECT command turns control over to an initialization routine 328, which generates the "disk select screen" (4) in process 330. With DISK ID selected DISK EDIT READY is put out to a print screen process 332. The latter process prints the "edit screen" (5), which displays the prerecorded picture along with a message identifying the display attributes, that is, the list of albums, which are associated with this level. The cursor is moved by sending UP/DOWN to process 334 and, once the cursor is adjacent a selected album, the decision to categorize this picture in the selected album is recorded via SELECT to an enterdelete process 336. The decision is stored in the remote memory 20. A next input process 338 looks for an active controller button by sending an INPUT REQUEST to the mechanical operating system 286 and waiting for a MASKED INPUT to come back. With the corresponding input active, the cursor is moved, a decision to enter or delete a picture from an album is made, the entire picture may be viewed (process 340), or a new picture may be retrieved (by FWD/REV to a picture selection process 341).

The picture edit level, described by FIG. 9, has a data flow similar to the disk edit level shown by FIG. 8. The "disk select screen" (4) and the "edit screen" (5) are produced by similar processes in the data flow and the decisions to enter or delete an album are accomplished similarly. A PICTURE EDIT SELECT command turns control over to an initialization routine 350, which generates the "disk select screen" (4) via process 352. A disk is selected just as in the disk edit level. Then, instead of displaying the first picture on the disk, the picture display process 354 retrieves the first picture which has not been previously selected for any album. After this picture has been evaluated for one or more albums, (by a process identical to that of the disk edit level) the FWD/REV command (originating from the remote controller) causes the retrieval of the next picture that is not assigned to any album. This process may be continued through all the disks until the reevaluation of unedited pictures is completed. As with the disk edit level, each album assignment is stored in the remote memory 20.

The album edit level, shown by FIG. 10, starts with selection of an album in process 342 (which produces the "album select screen" (6)) and follows with process 343 which displays message (7). Three editing actions may be taken, that is, the sequencing of pictures (sequence picture process 344), the sequencing of disks (sequence disk process 345), and the setting of picture viewing time (set view time process 346). The data flows and processes for cursor movement and the entering or deleting of display attributes relative to the album edit is subsumed within the illustrated process steps. For example, the cursor movement and assignment of picture order corresponding to screen (8) are included in the sequence picture process 344. The data flow is similar to that shown on the disk edit or picture edit levels.

The data flow diagrams have not been described in all their detail since a combined reading of the specification material regarding the "screens" and the data dictionary provide the requisite information for fully interpreting the data flow diagrams. In addition, the lowest level process "bubbles" shown in the Figures may be further broken down according to the ordinary practice of one skilled in structured systems design.

The invention has been described in detail with particular references to a presently preferred embodiment thereof, but it will be understood that variations and modifications can be effected within the spirit and scope of the invention.

TABLE I

DATA DICTIONARY

| NAMES | DEFINITIONS |
|---|---|
| ALBUM | Provide selected album |
| ALBUM EDIT SELECT | Call to album edit level while in another state |
| ALBUM SELECT | Call to album mode while in another state |
| COMPLETE | Return to current state from print screen |
| CONTROL DATA | Control parameters for graphics generation |
| CONTROLLER INPUT | IR signal to player |
| DISK EDIT READY | Call to print screen while in disk edit state |
| DISK EDIT SELECT | Call to disk edit level while in another state |
| DISK ID | Disk number |
| DISK EDIT SCREEN | Initialize edit screen |
| DISK NUMBER | Index into the magazine for the disk |
| EDIT SELECT | Call to edit mode while in another state |
| ENABLE | Start up file operating system |
| FWD/REV | Magazine (or frame) forward or magazine (or frame) reverse |
| GRAPHICS SIGNAL | Text and background color for TV display |
| INPUT REQUEST | Mask showing byte value for acceptable input selections |
| MAGAZINE DATA | Data from/to remote memory on the container |
| MAGAZINE MEMORY | EEROM on the disk container |
| MASKED INPUT | Bits set corresponding to user selection |
| NEW DISK REQUEST | Call to disk selection |
| NEW SELECTION | Return to previous state |
| NEXT INPUT | Call to normal input |
| NORMAL READY | Call to normal mode |
| NORMAL SELECT | Call to normal mode while in another state |
| NTSC VIDEO AND GRAPHICS | NTSC video signal and graphics signal |
| PICTURE | Video picture signal |
| PICTURE EDIT READY | Call to print edit screen while in picture edit state |
| PICTURE EDIT SELECT | Call to picture edit level while in another state |
| PICTURE SELECTION | Frame number and disk number |
| PICTURE SELECTION READY | Return to current state from picture select state |
| PICTURE TRACK | Picture video track on the disk |
| PRINT | Call to print a screen |
| RENAME EDIT SELECT | Call to rename edit level while in another state |
| SELECT | Enter cursor command |
| SELECT ALBUM | Call to album select screen |
| SELECT DISK | Call to disk select screen and return to current state |
| SELECT PICTURE | Call to picture select |
| SEQUENCE DISK SELECT | Call to sequence disks |
| SEQUENCE PICTURE SELECT | Call to sequence picture |
| SET TIME SELECT | Call to set time |
| SET UP READY | Call to print set-up screen |
| SET UP SCREEN | Initialize set-up screen |
| SET UP SELECT | Call to set-up mode while in another state |
| TEXT | Characters for display |
| TEXT EDIT SELECT | Call to text edit level while in another state |
| UP/DOWN | Move cursor up or down |
| USER SELECTIONS | Seven button selections on remote controller |
| UNLOAD | Magazine is moved to unload position |
| VIDEO SIGNAL | Video signal from picture track |
| VIEW COMPLETE | Return to edit state showing cropped picture |
| VIEW SELECT | Call to view all of picture |
| WORKING MEMORY | RAM in player circuit |

What is claimed is:

1. An editing method for further arranging the display of a plurality of video still pictures already arranged in part for display by subject-matter categories according to image content, the pictures being prerecorded upon video tracks on a plurality of video disks with the editing information pertaining to category assignment being stored in a memory associated with the disks, said method comprising the steps of:
  excluding one or more categories;
  selecting a video still picture unassignaed to said one or more excluded categories by reference to the memory associated with the disks;

reproducing a video signal from a video track corresponding to the selected picture;

generating a picture display from the video signal;

displaying the subject-matter categories into which the selected picture may be arranged;

assigning the selected picutre to one or more of the displayed categories; and storing the subject-matter category assignments in the memory associated with the disks.

2. A method as claimed in claim 1 in which said step of excluding one or more categories comprises excluding all of the categories and said step of selecting a video still picture therefore comprises selecting a picture that has not been assigned to any category.

3. A method as claimed in claim 1 in which the displayed subject-matter categories to which the picture may be assigned include the categories that were excluded for purpose of selecting the video still picture.

* * * * *